United States Patent
Lucien et al.

(10) Patent No.: US 12,142,042 B2
(45) Date of Patent: Nov. 12, 2024

(54) PERFORMER DENSITY ASSESSMENT

(71) Applicant: Disney Enterprises, Inc., Burbank, CA (US)

(72) Inventors: Mara Idai Lucien, Los Angeles, CA (US); Lori L. Huck, Los Angeles, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 337 days.

(21) Appl. No.: 17/750,217

(22) Filed: May 20, 2022

(65) Prior Publication Data

US 2023/0377334 A1 Nov. 23, 2023

(51) Int. Cl.
*G06V 20/40* (2022.01)
*G06V 10/70* (2022.01)

(52) U.S. Cl.
CPC .............. *G06V 20/42* (2022.01); *G06V 10/70* (2022.01); *G06V 20/49* (2022.01)

(58) Field of Classification Search
CPC ......... G06V 20/42; G06V 20/49; G06V 10/90
See application file for complete search history.

(56) References Cited

U.S. PATENT DOCUMENTS

| | | | |
|---|---|---|---|
| 2018/0046936 A1* | 2/2018 | Wang | G06N 20/10 |
| 2021/0406644 A1* | 12/2021 | Salman | G06N 3/045 |
| 2022/0342930 A1* | 10/2022 | Chandrashekar | G06F 16/783 |

* cited by examiner

*Primary Examiner* — Myron Wyche
(74) *Attorney, Agent, or Firm* — Farjami & Farjami LLP (57) ABSTRACT

A system for assessing performer density includes a computing platform having processing hardware and a memory storing software code. The processing hardware is configured to execute the software code to receive content and content data, the content data identifying one or more performer(s) depicted or referenced in the content, and determine, using the content and the content data, one or more segment(s) of the content in which the performer(s) is/are depicted or referenced. The processing hardware is further configured to execute the software code to infer, for each determined segment(s) of the content, a respective importance of the performer(s) in a respective context of each determined segment(s), and calculate, based on the determined segment(s) of the content and the respective importance of the performer(s), a respective density score of each performer with respect to the content.

18 Claims, 5 Drawing Sheets

PERFORMER DENSITY ASSESSMENT

BACKGROUND

Due to its nearly universal popularity as a content medium, ever more audio-video (AV) content is being produced and made available to consumers. As a result, the efficiency with which various creative and commercial aspects of that content can be analyzed and assessed has become increasingly important to a variety of stakeholders, including producers, owners, and distributors of that content, as well as to its investors.

One such aspect of interest regarding content is the notion of the overall importance of a particular performer to the storyline and events of the content, which may be a movie or television (TV) episode or series for example. However, a reliable system for assessing performer density within content does not presently exist. Use of acting credits is one current approach to assessing performer density within content, but acting credits tend to be unreliable and inconsistent due to varying approaches to their presentation. For example, some acting credits list characters and the actors who portray them in order of first appearance, while others list the top billed characters or cast first, and still other acting credits list characters and actors in alphabetical order. This makes it difficult for investors, distributors, and audiences to understand the relative importance of different performers within a work. For example, based on acting credits, it is possible to determine whether a favorite or trending actor is in a work, but not whether that actor performs a brief cameo or is a substantial contributor to the storyline and action. This lack of information undesirably hinders recommendations, search, and discovery within media platforms, while making business and creative assessments of performers and their performances at least challenging, and potentially inaccurate.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, a reliable system for assessing performer density within content does not presently exist. Use of acting credits is one current approach to assessing performer density within a work, but acting credits tend to be unreliable and inconsistent due to varying approaches to their presentation, as described above. For example, and as further noted above, based on acting credits, it is possible to determine whether a favorite or trending actor is in a work, but not whether that actor performs a brief cameo or is a substantial contributor to the storyline and action. This lack of information undesirably hinders meaningful recommendations, search, and discovery within media platforms, while making business and creative assessments of performers and their performances at least challenging, and potentially inaccurate.

The present application discloses systems and methods for assessing performer density with respect to content. It is noted that, as defined in the present application, the expression "performer density" refers to the presence of a performer within content, i.e., how frequently that performer appears, speaks, or acts within the content, or the importance of that performer to the context of the storyline or creative intent of the content, or to events depicted by the content. The present solution for assessing performer density applies a multimodal approach to quantifying performer presence and relative importance in content using a density score based on a variety of inputs, such as the visual and audio presence of the performer within the content, their role within the storyline or event sequence of the content, their important relationships and interactions, and their actions and words. In the present application, "density score" refers to a numerical score corresponding to a performer density with respect to content, wherein the density score is calculated based on one or more aspects of the visual presence of the performer within the content, the audio presence of the performer within the content, the role of the performer within the storyline or event sequence of the content, the relationships and interactions of the performer with other performers within content, or the actions and words of the performer.

As defined in the present application. "content" may refer to a variety of different types and genres of audio-video (AV) content, as well as to video unaccompanied by audio, audio unaccompanied by video, or to written text in the form of a movie script, a script of television (TV) programming content, a script of streaming content or other web-based content, a screenplay, or any other written work of literature or journalism (hereinafter "written text"). Specific examples of AV content include movies, TV episodes or series, video games, podcasts, and sporting events, which may be pre-recorded or received as a live feed for example. In addition, or alternatively, in some implementations, "content" may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the concepts disclosed by the present application may also be applied to content that is a hybrid of traditional AV and fully immersive VR/AR/MR experiences, such as interactive video. It is also noted that, as defined in the present application, the term "content"

may encompass musical works such as singles or albums, or even entire music catalogues.

Thus, and as also defined in the present application. "performer" may refer to an actor, a character assumed by an actor (hereinafter "character"), an animated or virtual character (hereinafter "animation"), or an athlete or other competitor in a sporting event, as well as a musician, composer, or music producer, to name a few examples.

It is also noted that a number of different use cases for the performer density assessment solution disclosed in the present application are possible. For example, in a consumer search use case, the present concepts enable a user to search for content featuring or including a performer favored by the user and receive an ordered ranking of content titles in which that performer is assessed to be most present when compared to other titles. Another potential use case is content recommendation, in which a media platform implements the present concepts in order to make recommendations to a consumer based on the types of performers that consumer likes, taking into account how much those types of performers are present in the works as well as their importance to the context of the work when compared to other performers in the work, i.e. are they headliners or main characters, do they appear in cameos, or are they receiving credit for non-performing participation such as directing or producing for instance. Yet another potential use case is business or creative analysis. For example, a studio or sports franchise may assess whether the return on investment for performer compensation justifies that financial outlay, or an investor may use the present solution to assess whether a proposed creative project is worth supporting financially. Furthermore, some or all of the above-described use cases may be implemented using automated or substantially automated systems and methods.

As defined in the present application, the terms "automation," "automated," and "automating" refer to systems and processes that do not require the participation of a human user, such as a system administrator. For example, although in some implementations a human system administrator may review the performance of the systems and methods disclosed herein, and, in some cases may participate in the performer assessments, that human involvement is optional. Thus, in some implementations, the processes described in the present application may be performed under the control of hardware processing components of the disclosed systems.

Moreover, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on features not explicitly defined in raw data. In various implementations, NNs may be trained as classifiers and may be utilized to perform image processing or natural-language processing (NLP).

Figure 1:
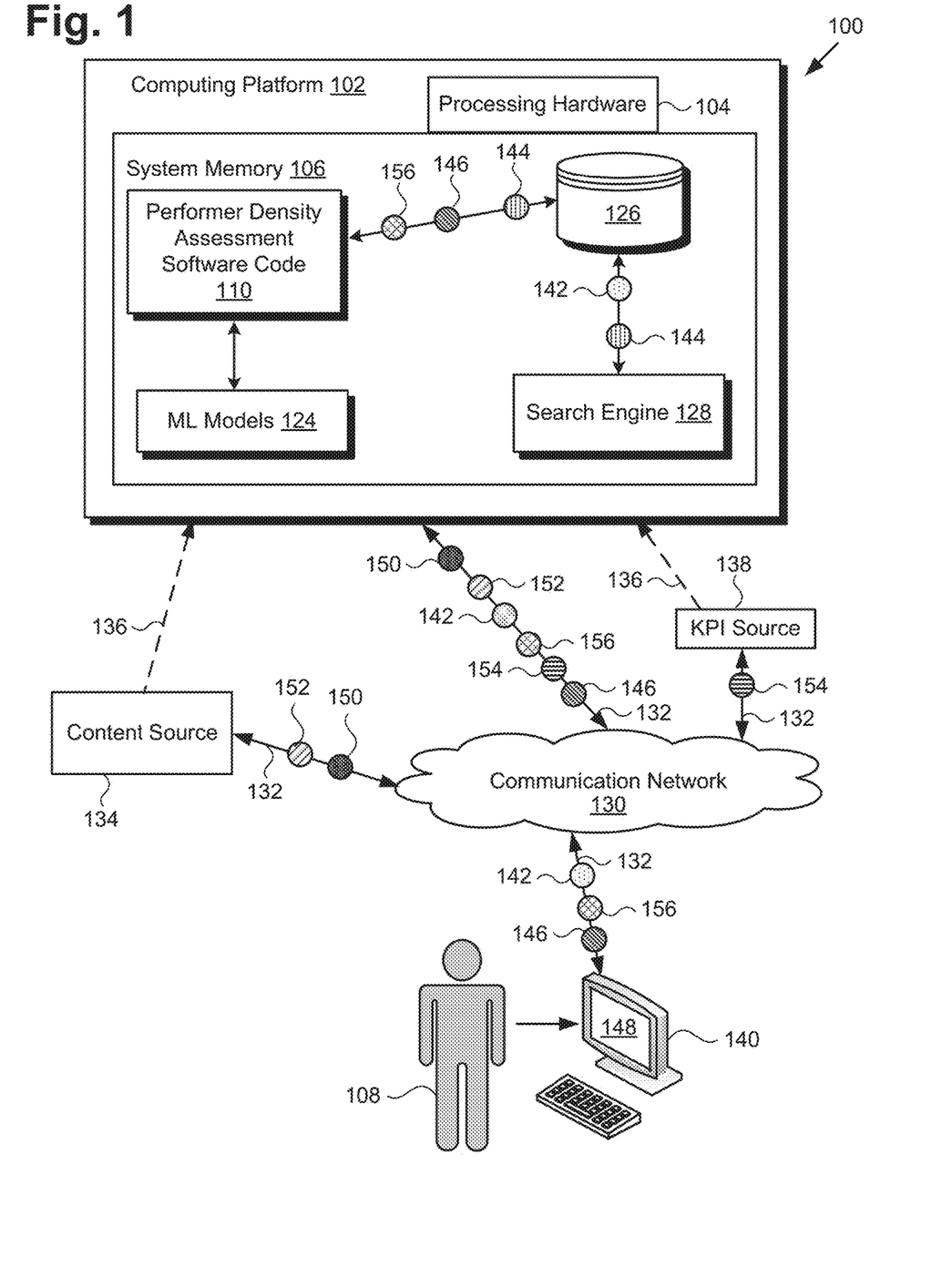
FIG. 1 shows a diagram of an exemplary system for assessing performer density with respect to content, according to one implementation.

FIG. 1 shows a diagram of exemplary system 100 for assessing performer density with respect to content, according to one implementation. System 100 includes computing platform 102 having processing hardware 104, and system memory 106 implemented as a computer-readable non-transitory storage medium. As shown in FIG. 1, according to some implementations, system memory 106 stores performer density assessment software code 110, trained machine learning models 124 (hereinafter "trained ML models 124"), performer density database 126, and in some of those implementations, also stores search engine 128.

As further shown in FIG. 1, system 100 may be implemented in a use environment including content source 134 providing content 150 and content data 152 identifying one or more performers depicted or referenced in content 150, key performance indicator (KPI) source 138 providing one or more KPIs 154 (hereinafter "KPI(s) 154"), communication network 130, and user 108 utilizing user system 140 including display 148. In addition, FIG. 1 shows network communication links 132 communicatively coupling content source 134, KPI source 138, and user system 140 with system 100 via communication network 130. Also shown in FIG. 1 are query 142 received by system 100 from user system 140, one or more density scores 144 (hereinafter "density score(s) 144") calculated using system 100, and respective first and second ranked lists 146 and 156 with respect to content 150, produced by system 100.

It is noted that, in various use cases, content 150 may include a single discrete unit of content, such as a movie or a TV episode, for example, or content 150 may include multiple units of content, such as a movie franchise or a series of TV episodes. Moreover, in some use cases, content 150 may include a library of content containing multiple examples of one or more of the various content types included in the definition of "content" provided above. It is further noted that, in addition to identifying one or more performers depicted or referenced in content 150, such as a cast list of content 150 for example, content data 152 may further supply one or more of the story role of each performer, the relationships amongst performers, or may include metadata tags, to name merely a few examples of content data 152.

It is also noted that first ranked list 146 and second ranked list 156 may take a variety of different forms. For example, in some use cases, first and second ranked lists 146 and 156 may rank the performers of content 150 based on the respective density score of each performer with respect to content 150, with the performer having the highest density score ranked first, the performer having the second highest density score ranked second, and so forth. Alternatively, in some other use cases, first and second ranked lists 146 and 156 may rank different content titles based on the performer density of a particular performer. i.e., performer A, across those titles, with the title in which the density score of performer A is highest being ranked first, the title in which the density score of performer A is second highest being ranked second, and so forth.

Although system 100 may receive content 150 and content data 152 from content source 134 via communication network 130 and network communication links 132, in some implementations, content source 134 may take the form of a content source integrated with computing platform 102, or may be in direct communication with system 100, as shown by dashed communication link 136. Analogously, although system 100 may receive KPI(s) 154 from KPI source 138 via communication network 130 and network communication links 132, in some implementations, KPI source 138 may be integrated with computing platform 102, or may be in direct communication with system 100, as also shown by dashed communication link 136. It is further noted that, in some implementations, system 100 may omit one or both of performer density database 126 and search engine 128. Thus, in some implementations, system memory 106 may store performer density assessment software code 110 and trained ML models 124, but not performer density database 126 or search engine 128.

With respect to the representation of system 100 shown in FIG. 1, it is noted that although performer density assessment software code 110, trained ML models 124, performer density database 126, and search engine 128 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts performer density assessment software code 110, trained ML models 124, performer density database 126, and search engine 128 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that performer density assessment software code 110, trained ML models 124, performer density database 126, and search engine 128 may be stored remotely from one another within the distributed memory resources of system 100. It is also noted that, in some implementations, one or more of trained ML models 124, and search engine 128 when included in system 100, may take the form of software modules included in performer density assessment software code 110.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU). "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as performer density assessment software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although user system 140 is shown as a desktop computer in FIG. 1, that representation is provided merely as an example. More generally, user system 140 may be any suitable mobile or stationary computing device or system that implements data processing capabilities sufficient to provide a user interface, support connections to communication network 130, and implement the functionality ascribed to user system 140 herein. For example, in other implementations, user system 140 and may take the form of a laptop computer, tablet computer, or smartphone.

With respect to display 148 of user system 140, display 148 may be physically integrated with user system 140, or may be communicatively coupled to but physically separate from respective user system 140. For example, where user system 140 is implemented as a smartphone, laptop computer, or tablet computer, display 148 will typically be integrated with user system 140. By contrast, where user system 140 is implemented as a desktop computer, display 148 may take the form of a monitor separate from user system 140 in the form of a computer tower. Furthermore, display 148 of user system 140 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2:
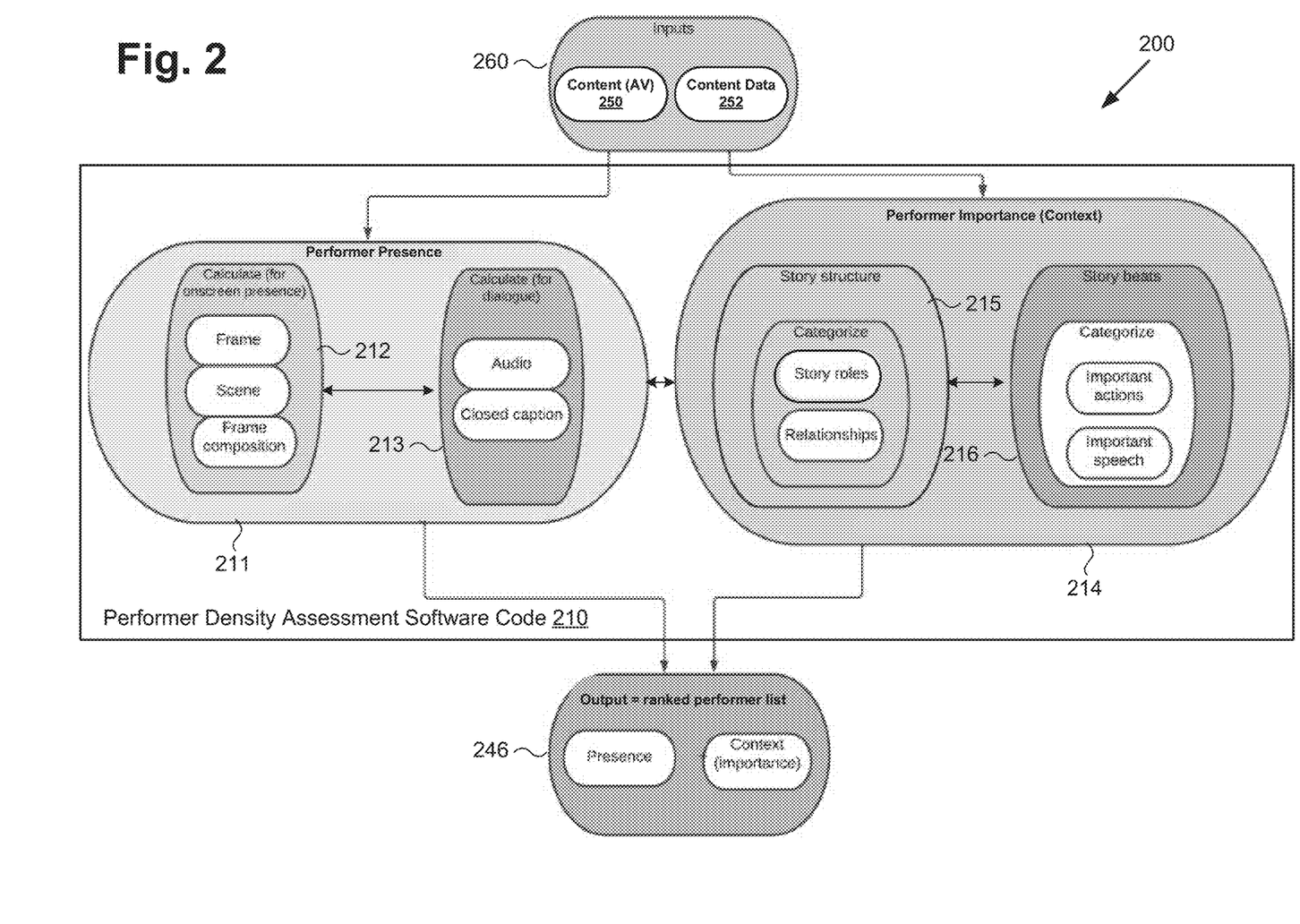
FIG. 2 shows an exemplary flow diagram for assessing performer density with respect to audio-video (AV) content, according to one implementation.

FIG. 2 shows exemplary flow diagram 200 for assessing performer density with respect to AV content, according to one implementation. According to exemplary flow diagram 200, performer density assessment software code 210 receives inputs 260 in the form of content 250 (hereinafter "AV content 250") and content data 252, processes those inputs using performer presence module 211 and performer importance module 214 of performer density assessment software code 210, and provides ranked performer list 246 (hereinafter "ranked list 246") with respect to AV content 250 as an output. As shown in FIG. 2, in some implementations, the results of one or more analyses executed by performer presence module 211 may be provided as inputs to performer importance module 214, and vice versa. Moreover, in some implementations, the processing of inputs 260 by performer presence module 211 and performer importance module 214 may be executed in parallel. i.e., contemporaneously.

As further shown in FIG. 2, performer presence module 211 includes onscreen presence calculation block 212 and dialogue calculation block 213, which may analyze performer presence independently of one another or in combination. That is to say, in some implementations, the results of one or more analyses executed by onscreen presence calculation block 212 may be provided as inputs to dialogue calculation block 213, and vice versa. Moreover, in some implementations, the respective analyses performed by each of onscreen presence calculation block 212 and dialogue calculation block 213 may be executed in parallel.

In addition, and as further shown in FIG. 2, performer importance module 214 includes story structure analysis block 215 and story beats analysis block 216, which may analyze performer importance independently of one another or in combination. That is to say, in some implementations, the results of one or more analyses executed by story structure analysis block 215 may be provided as inputs to story beats analysis block 216, and vice versa. Moreover, in some implementations, the respective analyses performed by each of story structure analysis block 215 and story beats analysis block 216 may be executed in parallel.

Story structure analysis block 215 may be configured to analyze metadata tags applied to story roles, such as Hero, Villain, Love Interest, and the like. The weighting applied to the importance of different story roles can be adjusted based on content type and genre, for example, but the Hero role is typically most important, the Villain role second, and the Love interest role third. Story structure analysis block 215 may also be configured to analyze relationships by type: Romantic, Adversarial. Familial, and so forth, weighting those relationships to the degree to which they drive plot. Those weights could be applied consistently to all content or may be adjusted based on genre or other factors, i.e., Romantic relationships could be weighted higher when the content genre is Romance or Romantic Comedy.

Story beats analysis block 216 may be configured to assign numeric values for important action, speech, or both within the overall plot of the content. Alternatively, certain actions or speech can be designated in the system as high value and therefore increase the importance of characters performing them. Example: rescuing a victim of crime is generally a higher value action to a plot than an action such as eating food, or sleeping. These values can all contribute to the value of a particular character to plot, in addition to their onscreen presence.

With respect to further distinctions between story structure and story beats, story structure addresses the breakdown of the storylines, where some titles may have a single storyline while others might have multiple storylines. The story roles and relationships can be calculated per storyline, or for the work as a whole. In TV, for example, it is common for episodes to have two to five, or more, storylines. Therefore story structure calculations could be done for each storyline, or for the episode as a whole.

By contrast, story beats are individual moments that move the plot along and make up the story. Within each story beat, important actions and important speech may be identified and receive a weighting, which may then be linked to performer of the important actions or speech, or the performer acted on or spoken to. For example, a marriage proposal is likely to be a high value story beat, and could merit a higher value for both the performer proposing and the performer being proposed to.

It is noted that AV content 250, content data 252, performer density assessment software code 210, and ranked list 246 correspond respectively in general to content 150, content data 152, performer density assessment software code 110, and first ranked list 146, in FIG. 1. Consequently, content 150, content data 152, performer density assessment software code 110, and first ranked list 146 may share any of the characteristics attributed to respective AV content 250, content data 252, performer density assessment software code 210, and ranked list 246 by the present disclosure, and vice versa. That is to say, like performer density assessment software code 210, performer density assessment software code 110 may include features corresponding to performer presence module 211 and performer importance module 214.

By way of example, the performer presence assessment executed by performer presence module 211 may quantify the amount of screen time that a particular performer has in AV content 250. Such screen time may be measured by performer presence module 211 of performer density assessment software code 110/210 using onscreen presence calculation block 212 and one or more of trained ML models 124 configured to perform one or more of scene based analysis of AV content 250, shot based analysis of AV content 250, or frame based analysis of AV content 250. It is noted that in the context of video or AV content, a "shot" refers to a sequence of video frames that is captured from a unique camera perspective without cuts and other cinematic transitions. Moreover, a "scene" refers to a sequence of shots that correspond to one another thematically, either by sharing a common background or location, or by being directed to the same event. i.e., series of actions. Thus, a shot may include multiple frames, while a scene may include multiple shots.

In addition to the mere presence (e.g., screen time) of a performer in various segments of AV content 250 such as scenes, shots, or frames, performer presence module 211 may also be configured to assess the prominence of that performer in each content segment in which the performer is present using another one or more of trained ML models 124. The prominence of a performer may be measured based on the space within a frame occupied by the performer, e.g., the number of pixels of the frame dedicated to a depiction of the performer, as well as whether the performer is determined to occupy the foreground or background of a scene, shot, or frame.

In addition to the visual analyses described above, performer presence module 211 may be configured to use dialogue calculation block 213 and yet another one or more of trained ML models 124 to analyze an audio component of AV content 250, as well as captioning included in AV content 250, to identify the presence of a performer who may not be visually represented in a particular scene, shot, or frame, but nevertheless participates in the action being depicted. For example, a performer that is unseen, off-screen, represented by a disembodied voice, or a performer in the form of an invisible character may be determined to be present despite not being visible.

By way of further example, the contextual performer importance assessment executed by performer importance module 214 may quantify the contextual importance or salience of a performer within AV content 250. For example performer importance module 214 may be configured to determine whether the performer is a main character, the story role of the performer, as well as, in some use cases, the character archetype portrayed by the performer, such as hero, villain, love interest, and so forth. Performer contextual importance may be measured by performer importance module 214 of performer density assessment software code 110/210 using story structure analysis block 215, story beats analysis block 216, and, in some implementations, inputs received from performer presence module 211 identifying the amount of dialogue or monologue spoken by the performer as determined by the number of times the performer speaks, as well as the number words of dialogue spoken by the performer. The character archetype portrayed by a performer may be determined by performer importance module 214 of performer density assessment software code 110/210 using one or more of trained ML models 124 configured to perform NLP, for example.

It is noted that although in some implementations, the character archetype portrayed by a performer may be determined by performer importance module 214 of performer density assessment software code 110/210 using one or more of trained ML models 124, in other implementations it may be advantageous or desirable to utilize human interpretations of character archetypes or other aspect performer importance.

The contextual importance of a performer may further be based on the number and importance of relationships that the performer is depicted to have with other performers included in AV content 250. It is noted that a relationship may be defined as important if it (1) meaningfully impacts the plot or storyline of AV content 250, or the sequence of actions depicted in AV content 250, or (2) is a relationship that is emphasized by AV content 250, for example through its recurrence in AV content 250. Thus, the contextual importance of a performer may be based on the role portrayed by the performer, the importance of the performer to other performers as manifested by relationships among performers, and the intensity of the speech and actions engaged in by the performer. For instance a performer engaged in instances of dynamic action, strong or volatile interactions, or both, may be assessed as being engaged in actions that are contextually more important to AV content 250 than a consistently passive performer having equal performer presence. In addition, a performer engaging in speech that is one or more of extended in duration, impassioned, or accompanied by dramatic gestures or facial expressions may be assessed as being engaged in important speech.

In some implementations, the quantitative assessments executed by respective performer presence module 211 and performer importance module 214 for each performer may be equally weighted and combined to calculate a density score for that performer. Alternatively, in some implementations, it may be advantageous or desirable to calculate the density scores using a weighted combination of those quantitative assessments, using a weighting scheme that may vary from one specific use case to another for example, and which may be set manually or may be optimized using one or more of ML models 124.

As shown in FIG. 2, the output produced as a result of flow diagram 200 is ranked list 246. As noted above, ranked list 246 may list each of the performers included in AV content 250 and identified by content data 252 according to their respective density scores, from highest to lowest. For example, where content data 252 includes a cast list for AV content 250, ranked list 246 may include that cast list ordered or reordered so as to list the performers according to their respective density scores with respect specifically to AV content 250, and may do so without regard to the public profiles, fame, compensation, order of appearance, or importance to content other than AV content 250, of those performers. Alternatively, and as also noted above, ranked list 246 may rank different content titles based on the performer density of a particular performer. i.e., performer A, across those titles, with the title in which the density score of performer A is highest being ranked first, the title in which the density score of performer A is second highest being ranked second, and so forth.

Figure 3:
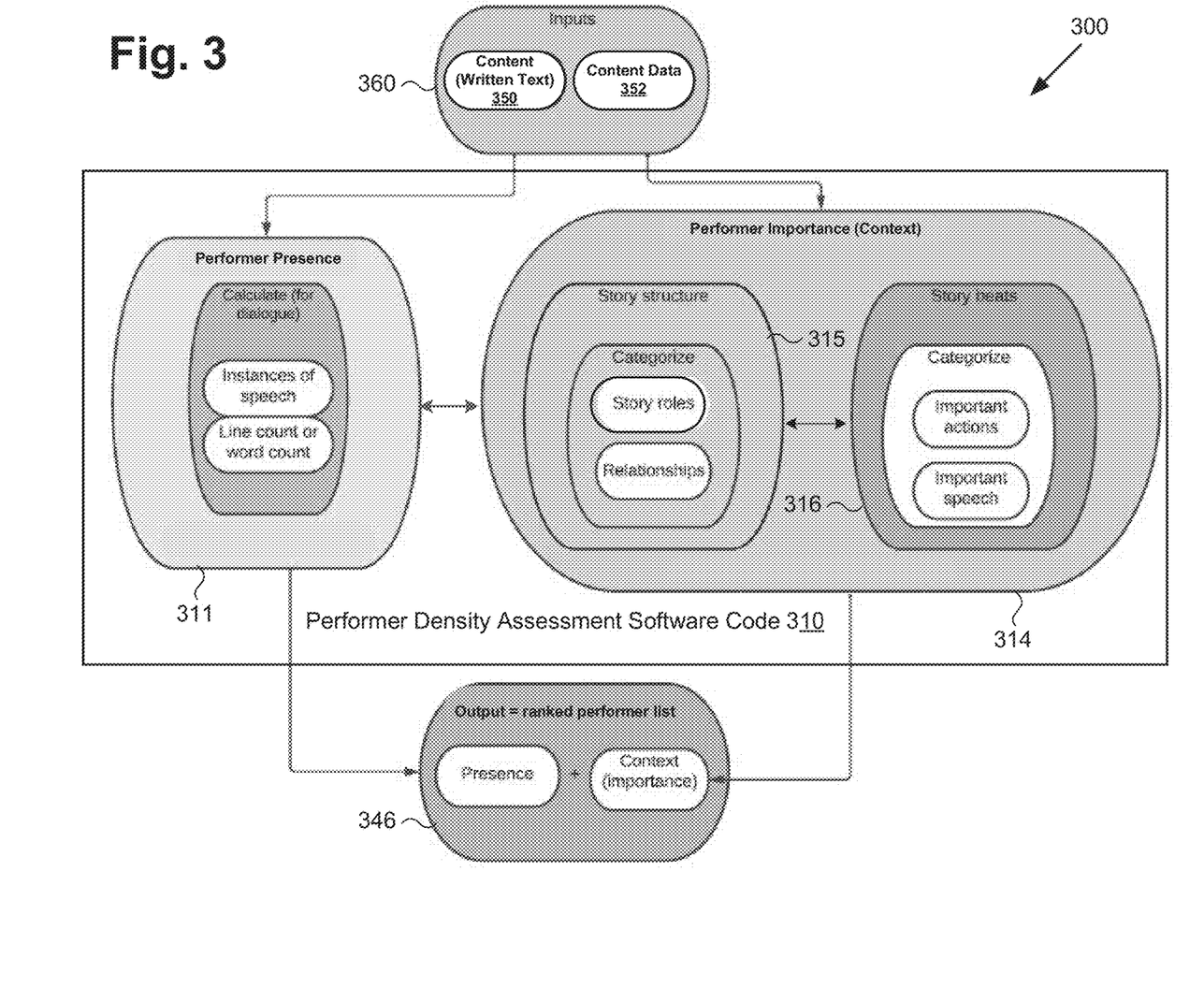
FIG. 3 shows an exemplary flow diagram for assessing performer density with respect to written text, according to one implementation.

FIG. 3 shows exemplary flow diagram 300 for assessing performer density with respect to written text (e.g., a movie script, a script of TV programming content, or a script of streaming content or other web-based content), according to one implementation. According to exemplary flow diagram 300, performer density assessment software code 310 receives content 350 as inputs 360 in the form of written text, as described above (hereinafter "written text 350"), and content data 352, processes those inputs using performer presence module 311 and performer importance module 314 of performer density assessment software code 310, and provides ranked performer list 346 (hereinafter "ranked list 346") as an output. As shown in FIG. 3, in some implementations, the results of one or more analyses executed by performer presence module 311 may be provided as inputs to performer importance module 314, and vice versa. Moreover, in some implementations, the processing of inputs 360 by performer presence module 311 and performer importance module 314 may be executed in parallel, i.e., contemporaneously.

As further shown in FIG. 3, performer importance module 314 includes story structure analysis block 315 and story beats analysis block 316, which may analyze performer importance independently of one another or in combination. That is to say, in some implementations, the results of one or more analyses executed by story structure analysis block 315 may be provided as inputs to story beats analysis block 316, and vice versa. Moreover, in some implementations, the respective analyses performed by each of story structure analysis block 315 and story beats analysis block 316 may be executed in parallel.

It is noted that written text 350, content data 352, performer density assessment software code 310, and ranked list 346 correspond respectively in general to content 150, content data 152, performer density assessment software code 110, and first ranked list 146, in FIG. 1. Consequently, content 350, content data 352, performer density assessment software code 310, and ranked list 346 may share any of the characteristics attributed to respective script 150, content data 152, performer density assessment software code 110, and first ranked list 146 by the present disclosure. That is to say, like performer density assessment software code 310, performer density assessment software code 110 may include features corresponding to performer presence module 311 and performer importance module 314.

The performer presence assessment executed by performer presence module 311 may quantify the amount of speech, whether in dialogue or monologue, that a particular performer has in written text 350. That amount of speech may be measured by one or more of the number of words spoken by the performer or the number of distinct instances of speech by the performer. Alternatively, or in addition, the performer presence may be assessed based on one or more of how the performer is described in script or how many scenes the performer is described as being present in.

The contextual performer importance assessment executed by performer importance module 314 may quantify the contextual importance or salience of a performer to written text 350. For example performer importance module 314 may be configured to determine whether the performer is a main character, the story role of the performer, as well as, in some use cases, the character archetype portrayed by the performer, such as hero, villain, love interest, and so forth. Performer contextual importance may be measured by performer importance module 314 of performer density assessment software code 110/210 using story structure analysis block 315, story beats analysis block 316, and one or more of trained ML models 124 configured to perform NLP, for example.

The contextual importance of a performer may further be based on the number and importance of relationships that the performer is depicted to have with other performers included in written text 350. As noted above, a relationship may be defined as important if it meaningfully impacts the plot or storyline of written text 350 or is a relationship that emphasized by written text 350, for example through recurrent reference. Thus, the contextual importance of a performer may be based on the role portrayed by the performer, the importance of the performer to other performers as manifested by relationships among performers, and the intensity of the speech and actions engaged in by the performer. For instance, a performer that is described by written text 350 as being engaged in instances of dynamic action, strong or volatile interactions, or both, may be assessed as being engaged in actions that are contextually more important to written text 350 than a consistently passive performer having equal performer presence. In addition, a performer engaging in speech that is one or more of extended in duration, impassioned, or described as important in notations included in written text 350 may be assessed as being engaged in important speech.

In some implementations, the quantitative assessments executed by respective performer presence module 311 and performer importance module 314 for each performer may be equally weighted and combined to calculate a density score for that performer. Alternatively, in some implementations, it may be advantageous or desirable to calculate the density scores using a weighted combination of those quantitative assessments, using a weighting scheme that may vary from one specific use case to another for example, and which may be set manually or may be optimized using one or more of ML models 124.

As shown in FIG. 3, the output produced as a result of flow diagram 300 is ranked list 346. Ranked list 346 may list each of the performers included in written text 350 and identified by content data 352 according to their respective density scores, from highest to lowest. For example, where content data 252 includes a cast list of written text 350, ranked list 346 includes that cast list ordered or reordered so as to list the performers according to their respective density scores with respect specifically written text 350. Alternatively, ranked list 346 may rank different scripts based on the performer density of a particular performer, i.e., performer A, across those scripts, with the script in which the density score of performer A is highest being ranked first, the script in which the density score of performer A is second highest being ranked second, and so forth.

It is noted that the performer density assessment approaches described by reference to FIGS. 2 and 3 may be performed independently of one another, or may be used in combination. For example, the approach outlined by flow diagram 200 can only be performed after AV content 250 has produced, while the approach outlined by flow diagram 300 can be performed on a script that AV content 250 is to be based, before production of AV content 250. In some implementations, it may be advantageous or desirable to use the approach outlined by flow diagram 300 first, and use the performer density assessment to help determine whether the production of AV content 250 is to be green lighted, to make casting decisions for AV content 250, or both. Moreover, in some implementations, it may be advantageous or desirable to use the approach outlined by flow diagram 300 prior to production of AV content 250, perform the approach outlined by flow diagram 200 after production of AV content 250, and compare the resulting performer density assessments, for example to evaluate the extent to which AV content 250 is faithful to the creative intent expressed by written text 350.

Figure 4:
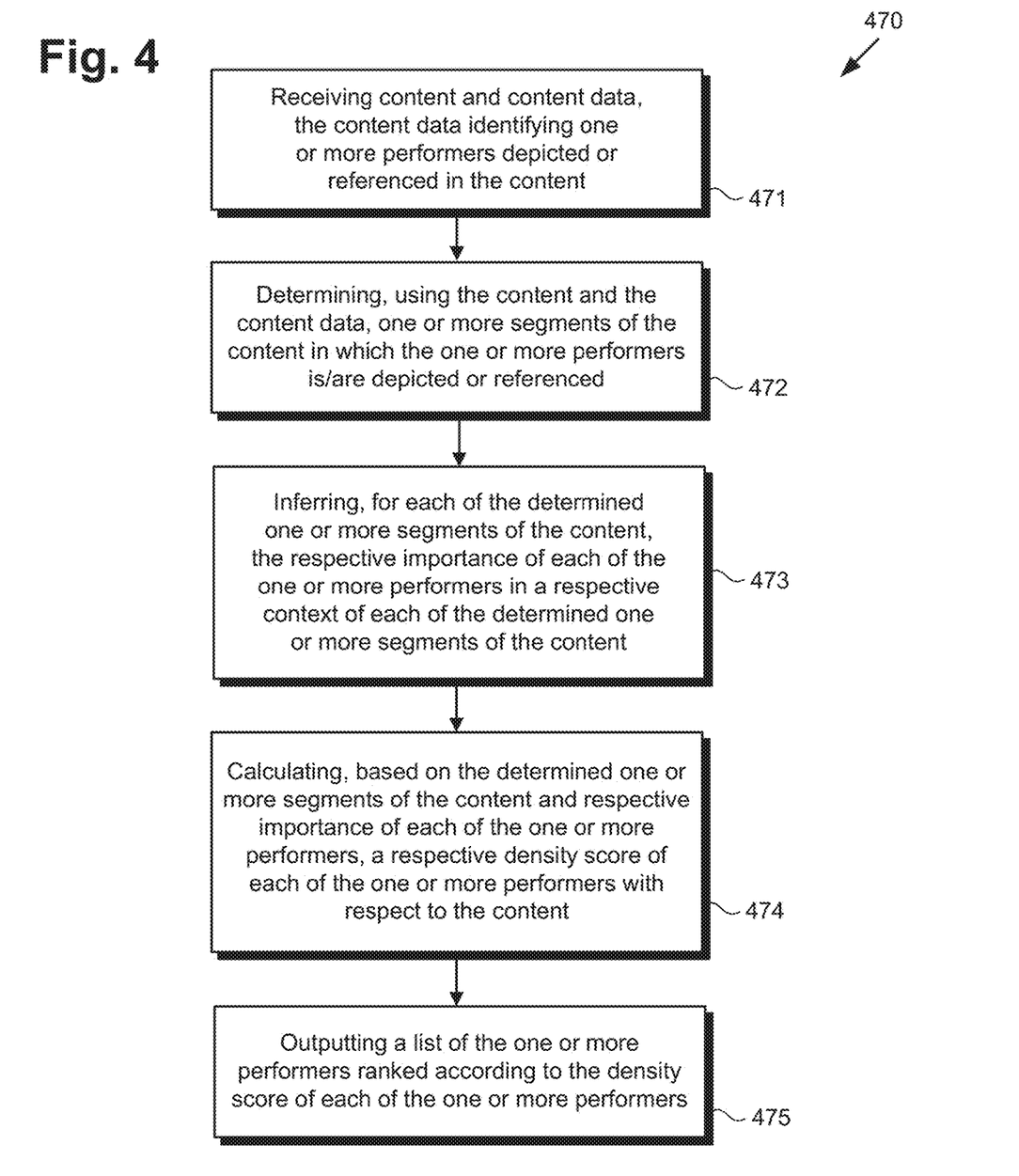
FIG. 4 shows a flowchart outlining an exemplary method for assessing performer density with respect to content, according to one implementation.

The functionality of system 100, in FIG. 1, will be further described by reference to FIG. 4. FIG. 4 shows flowchart 470 presenting an exemplary method for assessing performer density with respect to content, according to one implementation. With respect to the method outlined in FIG. 4, it is noted that certain details and features have been left out of flowchart 470 in order not to obscure the discussion of the inventive features in the present application.

Referring now to FIG. 4 in combination with FIG. 1, flowchart 470 begins with receiving content 150 and content data 152, content data 152 identifying at least one performer depicted or referenced in content 150 (action 471). Content 150 and content data 152 may be received in action 471 by performer density assessment software code 110, executed by processing hardware 104 of system 100. For example, as shown in FIG. 1, in some implementations, content 150 and content data 152 may be received by system 100 from content source 134, either via communication network 130 and network communication links 132 or directly via communication link 136.

As noted above, content 150 may include any of a variety of different types and genres of AV content, as well as video unaccompanied by audio, audio unaccompanied by video, or text in the form of a movie script, a script of TV programming content, a script of streaming content or other web-based content, a screenplay, or any other written work of literature or journalism. Specific examples of AV content include movies. TV episodes or series, video games, podcasts, and sporting events, which may be pre-recorded or received as a live feed for example. In addition, or alternatively, in some implementations, content 150 may be or include digital representations of persons, fictional characters, locations, objects, and identifiers such as brands and logos, for example, which populate a VR. AR, or MR environment. Moreover, content 150 may depict virtual worlds that can be experienced by any number of users synchronously and persistently, while providing continuity of data such as personal identity, user history, entitlements, possessions, payments, and the like. Alternatively, or in addition, content 150 may be or include a hybrid of traditional AV and fully immersive VR/AR/MR experiences, such as interactive video. Thus and as also noted above, a performer identified by content data 152 as being depicted or referenced in content 150 may be an actor, a character, an animation, or an athlete or other competitor in a sporting event, to name a few examples.

Flowchart 470 further includes determining, using content 150 and content data 152, one or more segments of content 150 in which the at least one performer identified by content data 152 is depicted or referenced (action 472). Determination of the one or more segments of content 150 in which a performer identified by content data is depicted or referenced may be performed in action 472 by performer density assessment software code 110, executed by processing hardware 104 of computing platform 102, and using one or more of trained ML models 124. For example, referring to FIGS. 2 and 3 in combination with FIGS. 1 and 4, action 472 may be performed by performer presence module 211/311 of performer density assessment software code 110/210/310, executed by processing hardware 104 of system 100, as described above by reference to FIGS. 2 and 3.

For instance, in implementations in which content 150 includes AV content, processing hardware 104 may execute performer density assessment software code 110 to utilize a visual analyzer included among trained ML models 124, an audio analyzer included among trained ML models 124, or such a visual analyzer and audio analyzer, to perform action 472. In various implementations, a visual analyzer included among trained ML models 124 may take the form of a computer vision model, a Contrastive Language-Image Pre-Training (CLIP) model, or may be configured to apply any other suitable AI techniques to content 150.

An audio analyzer included among trained ML models 124 may also be implemented as a NN or other type of ML model. As noted above, in some implementations, a visual analyzer and an audio analyzer may be used in combination to analyze content 150. For instance, in analyzing a sporting event, the audio analyzer can be configured or trained to listen to the audio track of the event, and its analysis may be verified using the visual analyzer or the visual analyzer may interpret the video of the event, and its analysis may be verified using the audio analyzer. It is noted that content 150 will typically include multiple video frames and multiple audio frames. In some of those use cases, processing hardware 104 may execute performer density assessment software code 110 to perform the visual analysis of content 150, the audio analysis of content 150, or both the visual analysis and the audio analysis, on a frame-by-frame basis.

In some use cases, content 150 may include text, such as subtitles or other captioning for example. In use cases in which content 150 includes text, processing hardware 104 may further execute performer density assessment software code 110 to utilize a text analyzer included among trained ML models 124 to analyze content 150. Thus, in use cases in which content 150 includes text, action 472 may further include analyzing that text. Moreover, in implementations in which content 150 takes the form of written text 350, the one or more segments of content 150 determined in action 472 may be one or more of acts, scenes, or chapters identified by written text 350.

It is further noted that, in some use cases, content 150 may include metadata. In use cases in which content 150 includes metadata, processing hardware 104 may execute performer density assessment software code 110 to utilize a metadata parser included as a feature of software code 110 to extract metadata from content 150. Thus, in use cases in which content 150 includes metadata, action 472 may further include extracting and analyzing that metadata.

Flowchart 470 further includes inferring, for each of the one or more segments of content 150 determined to depict or reference the one or more performers identified by content data 152, a respective importance of each performer in a respective context of each segment of content 150 in which that performer is depicted or referenced (action 473). Action 473 may be performed by performer density assessment software code 110, executed by processing hardware 104 of system 100, and using another one or more of trained ML models 124. For example, referring to FIGS. 2 and 3 in combination with FIGS. 1 and 4, action 473 may be performed by performer importance module 214/314 of performer density assessment software code 110/210/310, executed by processing hardware 104 of system 100, as described above by reference to FIGS. 2 and 3.

In use cases in which content 150 includes AV content, those one or more of trained ML models 124 used in action 473 may be configured or trained to recognize which performers are speaking, as well as the intensity of their delivery, using the results of one or both of the visual analysis and the audio analysis performed as part of action 472. In particular, such trained ML models may be configured or trained to identify humans, characters, or other talking animated objects, identify emotions or intensity of messaging, and to perform NLP, for example, to identify specific actions and/or words that have been deemed higher value and to weight them more heavily than lower value actions and speech. In various use cases, different implementations of such trained ML models may be used for different types of content (i.e., a specific configuration or training for specific content). As shown in FIGS. 2 and 3, in some implementations, the results of one or more analyses executed by performer presence module 211/311 may be provided as inputs to performer importance module 214/314. Moreover, and as noted above, in some implementations, the processing of inputs 260/360 by performer presence module 211/311 and performer importance module 214/314 may be executed in parallel. i.e., contemporaneously. That is to say, in those implementations, actions 472 and 473 of flowchart 470 may be performed in parallel.

Flowchart 470 further includes calculating, based on the one or more segments determined in action 472 and the respective importance of the at least one performer inferred in action 473, a respective one of density score(s) 144 of each performer with respect to content 150 (action 474). Referring to FIGS. 2 and 3 in combination with FIGS. 1 and 4, action 474 may be performed by performer density assessment software code 110/210/310, executed by processing hardware 104 of system 100, in a manner analogous to that described above by reference to FIGS. 2 and 3, and using yet another one or more of trained ML models 124. It is noted that density score(s) may be stored in performer density database 126, as shown in FIG. 1, or may be utilized by system 100 to provide first ranked list, as described below.

It is further noted that in use cases in which content 150 includes multiple segments in which a particular performer is depicted or referenced, calculating a density score for that performer would typically include determining the importance of the performer in each of those segment, and then aggregating across all of those segments. For example, calculating a density score for a performer could include taking into account the percentage of screen time devoted to that performer, using one or more of trained ML models 124, as well as the percentage of speech by that performer compared to other performers, using one or more other(s) of trained ML models 124. That calculation could also include the weightings applied to the story role of the performer, relationships of the performer within content 150, and importance actions and speech by the performer versus other performers depicted in or referenced in content 150.

In some implementations, the method outlined by flowchart 470 may conclude with action 474 described above. However, in implementations in which content 150 includes multiple performers identified by content data 152, flowchart 470 may further include outputting first ranked list 146, in which the performers identified by content data 152 are ranked according to the respective density score of each of the performers (action 475). Continuing to refer to FIGS. 2 and 3 in combination with FIGS. 1 and 4, first ranked list 146/246/346 may be output in action 475 by performer density assessment software code 110/210/310, executed by processing hardware 104 of system 100, as described above by reference to FIGS. 2 and 3. As shown in FIG. 1, for example, in some implementations action 475 may include transmitting first ranked list 146 to user system 140, via communication network 130 and network communication links 132, for rendering on display 148.

Figure 5:
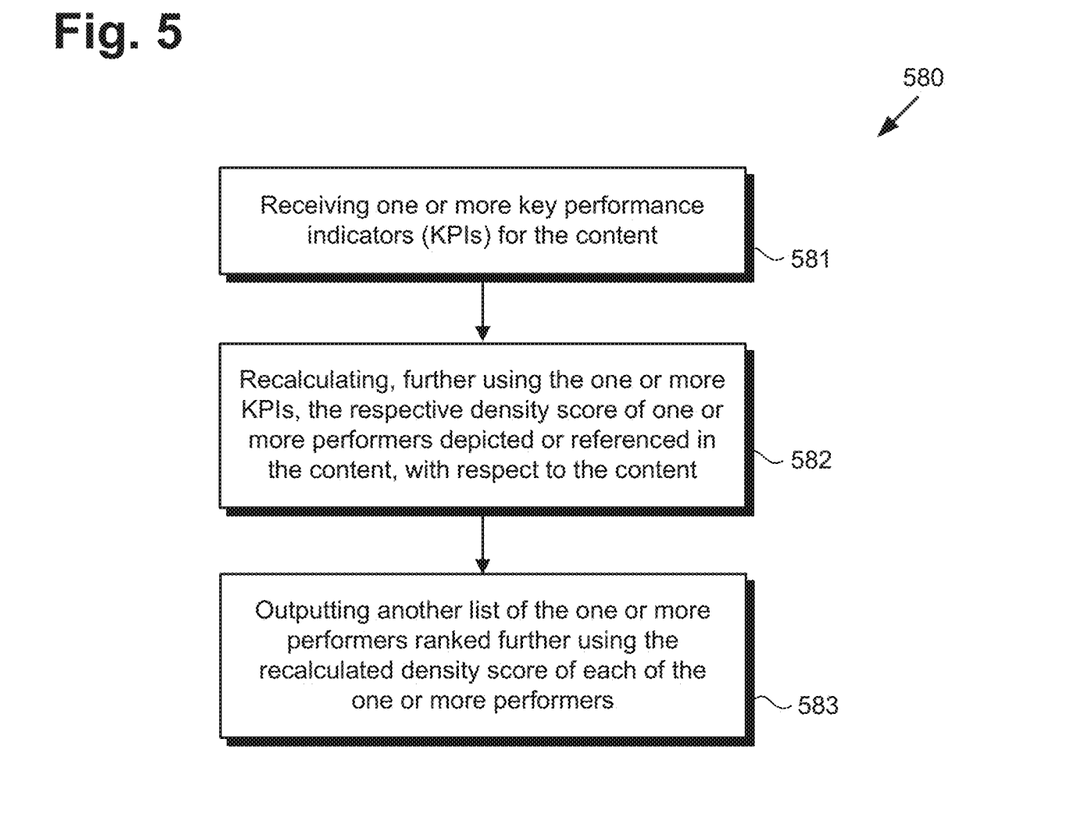
FIG. 5 shows a flowchart describing exemplary actions for extending the method outlined in FIG. 4, according to one implementation.

Referring now to FIG. 5, FIG. 5 shows flowchart 580 describing exemplary actions for extending the method outlined in FIG. 4, according to one implementation. With respect to the actions described in FIG. 5, it is noted that certain details and features have been left out of flowchart 580 in order not to obscure the discussion of the inventive features in the present application.

Flowchart 580 includes, subsequent to the performance of action 474 or action 475 of flowchart 470, receiving KPI(s) 154 for content 150 (action 581). KPI(s) 154 may include one or more of a variety of metrics, such as the "box office" or revenue generated by content 150, the audience market share of content 150, and consumer ratings of content 150, to name a few examples. KPI(s) 154 may be received in action 581 by performer density assessment software code 110, executed by processing hardware 104 of system 100. For example, as shown in FIG. 1, in some implementations, content KPI(s) 154 may be received by system 100 from KPI source 138, either via communication network 130 and network communication links 132 or directly via communication link 136.

Flowchart 580 also includes recalculating, further using KPI(s) 154, the respective density score of one or more performers depicted or referenced in content 150, with respect to content 150 (action 582). By way of example, in use cases in which KPI(s) 154 reveal that revenues or audience share exceeded projections for content 150, the weighting factor applied to performer importance may be increased relative to the weighting factor applied to performer presence for one or more lead performers in content 150, such as a star athlete, lead actor, or hero character. The recalculation of action 582 may be performed by performer density assessment software code 110, executed by processing hardware 104 of system 100.

In some implementations, the method outlined by flowchart 580 may conclude with action 582 described above. However, in other implementations, flowchart 580 may further include outputting second ranked list 156, in which the performers identified by content data 152 are ranked further using the recalculated density scores of the performers (action 583). Second ranked list 156 may be output in action 583 by performer density assessment software code 110, executed by processing hardware 104 of system 100. As shown in FIG. 1, for example, in some implementations action 583 may include transmitting second ranked list 156 to user system 140, via communication network 130 and network communication links 132, for rendering on display 148.

It is noted that although in some implementations, as described above, first ranked list 146 may be displayed to user 108 before second ranked list 156, that representation is merely by way of example. In other implementations, the density scores included in first ranked list 146 may be recalculated and second ranked list 156 may be generated and displayed to user 108 before user 108 has viewed first ranked list 146. Alternatively, in some implementations, user 108 may select which of first ranked list 146 or second ranked list 156 to view.

As noted above, in some implementations, system 100 includes one or both of performer density database 126 and search engine 128. In various implementations, search engine 128 may be configured to identify content featuring performers favored by user 108, based on query 142 received from user system 140. For example, user 108 may receive an ordered ranking of content titles in which a performer identified by query 142 is assessed to be most present. Alternatively, or in addition, search engine 128 may be implemented as a recommendation engine configured to proactively surface an ordered ranking of content titles featuring predicted to be liked by user 108, based on past queries or content consumption by user 108.

Although, as noted above, in some implementations system 100 may be configured to generate one or both of first ranked list and second ranked list 146 and 156 in response to receiving query 142 from user system 140, in other implementations, system 100 may be configured to generate one or both of first ranked list and second ranked list 146 and 156 for storage in performer density database, which may be updated dynamically by system 100 when new content and new content data are received from content source 134, for example. Moreover, in some implementations, performer density assessment software code 110 may be configured to apply one or more tie-breaker criteria to first or second rank lists 146 and 156. For example, if one of first and second ranked lists 146 and 156 includes a list of titles in which performer A appears, based on the density score of performer A in each title, and two or more titles share the same ranking based on density score alone, a tie-breaker criteria based on how current each title is could be applied. That is to say, by way merely of example, if performer A has equal density scores in two separate works, but one work is from ten years ago, and the other work is present-year, the newer work could be ranked higher than the older work.

With respect to the actions described by flowcharts 470 and 580, it is noted that actions 471, 472, 473, and 474 (hereinafter "actions 471-474"), actions 471-474 and 475, actions 471-474, 581, and 582, actions 471-474, 475, 581, and 582, actions 471-474, 581, 582, and 583, or actions 471-474, 475, 581, 582, and 583, may be performed as automated processes from which human involvement may be omitted.

Thus, the present application discloses systems and methods for assessing performer density with respect to content. The solution disclosed in the present application advances the state-of-the-art in several ways. For example, the present solution advantageously enables a user to search for content featuring or including a favorite performer and receive an ordered ranking of content titles in which that performer is assessed to be most present. In addition, the present solution advantageously enables a media platform to make recommendations to a consumer based on the types of performers that consumer likes, taking into account how much those types of performers are present in the works as well as their importance to the context of the work. The solution disclosed in the present application further advantageously enables a studio or sports franchise to assess whether the return on investment for performer compensation justifies that cost, as well as enabling an investor to assess whether a proposed creative project is worth supporting financially.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:
1. A system comprising:
a computing platform having a processing hardware and a system memory storing a software code;

the processing hardware configured to execute the software code to:
- receive content and content data, the content data identifying at least one performer depicted or referenced in the content;
- receive one or more key performance indicators (KPIs) for the content;
- determine, using the content and the content data, one or more segments of the content in which the at least one performer is depicted or referenced;
- infer, for each of the determined one or more segments of the content, a respective importance of the at least one performer in a respective context of each of the determined one or more segments of the content;
- calculate, based on the one or more KPIs, the determined one or more segments of the content and the respective importance of the at least one performer, a respective density score of each of the at least one performer with respect to the content.

2. The system of claim 1, wherein:
- determining the one or more segments uses one or more first trained machine learning (ML) models;
- inferring the respective importance of the at least one performer uses one or more second trained ML models; and
- calculating the respective density score of each of the at least one performer uses one or more third trained ML models.

3. The system of claim 1, wherein the content comprises written text.

4. The system of claim 1, wherein the at least one performer comprises at least one of an actor, a character, or an animation.

5. The system of claim 1, wherein the content comprises one of a movie, TV programming content, web-based content, or a video game.

6. The system of claim 5, wherein:
- determining the one or more segments uses one or more first trained ML models configured to perform at least one of a visual analysis or an audio analysis of the content;
- inferring the respective importance of the at least one performer uses one or more second trained ML models and a result of the at least one of the visual analysis or the audio analysis; and
- calculating the respective density score of each of the at least one performer uses one or more third trained ML models.

7. The system of claim 1, wherein the content comprises a sporting event, and wherein the at least one performer comprises an athlete.

8. The system of claim 1, wherein the at least one performer comprises a plurality of performers, and wherein the processing hardware is further configured to execute the software code to:
- output a list of the plurality of performers ranked according to the respective density score of each of the plurality of performers.

9. The system of claim 1, wherein the one or more KPIs comprise at least one of revenue generated by the content, audience market share of the content, or consumer ratings of the content.

10. A method for use by a system including a computing platform having a processing hardware, and a system memory storing a software code, the method comprising:
- receiving, by the software code executed by the processing hardware, content and content data, the content data identifying at least one performer depicted or referenced in the content;
- receiving, by the software code executed by the processing hardware, one or more key performance indicators (KPIs) for the content;
- determining, by the software code executed by the processing hardware and using the content and the content data, one or more segments of the content in which the at least one performer is depicted or referenced;
- inferring, by the software code executed by the processing hardware, for each of the determined one or more segments of the content, a respective importance of the at least one performer in a respective context of each of the determined one or more segments of the content; and
- calculating, by the software code executed by the processing hardware based on the one or more KPIs, the determined one or more segments of the content and the respective importance of the at least one performer, a respective density score of each of the at least one performer with respect to the content.

11. The method of claim 10, wherein:
- determining the one or more segments uses one or more first trained machine learning (ML) models;
- inferring the respective importance of the at least one performer uses one or more second trained ML models; and
- calculating the respective density score of each of the at least one performer uses one or more third trained ML models.

12. The method of claim 10, wherein the content comprises written text.

13. The method of claim 10, wherein the at least one performer comprises at least one of an actor, a character, or an animation.

14. The method of claim 10, wherein the content comprises one of a movie, TV programming content, web-based content, or a video game.

15. The method of claim 14, wherein:
- determining the one or more segments uses one or more first trained ML models configured to perform at least one of a visual analysis or an audio analysis of the content;
- inferring the respective importance of the at least one performer uses one or more second trained ML models and a result of the at least one of the visual analysis or the audio analysis; and
- calculating the respective density score of each of the at least one performer uses one or more third trained ML models.

16. The method of claim 10, wherein the content comprises a sporting event, and wherein the at least one performer comprises an athlete.

17. The method of claim 10, wherein the at least one performer comprises a plurality of performers, the method further comprising:
- outputting, by the software code executed by the processing hardware, a list of the plurality of performers ranked according to the respective density score of each of the plurality of performers.

18. The method of claim 10, wherein the one or more KPIs comprise at least one of revenue generated by the content, audience market share of the content, and consumer ratings of the content.

* * * * *